US010114852B2

United States Patent
Dham et al.

(10) Patent No.: US 10,114,852 B2
(45) Date of Patent: *Oct. 30, 2018

(54) METHODS AND APPARATUS FOR CONTROLLED REMOVAL OF CONTENT FROM A DISTRIBUTED NETWORK

(71) Applicant: SLING MEDIA INC., Foster City, CA (US)

(72) Inventors: Vikram Dham, Fremont, CA (US); Ilya Asnis, San Jose, CA (US)

(73) Assignee: SLING MEDIA L.L.C., Foster City, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/815,368

(22) Filed: Jul. 31, 2015

(65) Prior Publication Data

US 2015/0339340 A1 Nov. 26, 2015

Related U.S. Application Data

(63) Continuation of application No. 12/833,753, filed on Jul. 9, 2010, now Pat. No. 9,131,263.

(51) Int. Cl.
| | |
|---|---|
| *G06F 12/00* | (2006.01) |
| *G06F 17/30* | (2006.01) |
| *H04N 21/231* | (2011.01) |
| *H04N 21/235* | (2011.01) |
| *H04N 21/435* | (2011.01) |
| *H04N 21/436* | (2011.01) |
| *H04N 21/84* | (2011.01) |

(52) U.S. Cl.
CPC ..... *G06F 17/30371* (2013.01); *H04N 21/235* (2013.01); *H04N 21/23106* (2013.01); *H04N 21/435* (2013.01); *H04N 21/43615* (2013.01); *H04N 21/84* (2013.01)

(58) Field of Classification Search
USPC ........................................................ 707/813
See application file for complete search history.

(56) References Cited

U.S. PATENT DOCUMENTS 7,647,365 B2   1/2010  Horvitz et al.

OTHER PUBLICATIONS

Canadian Intellectual Property Office, Official Action in Canadian Patent Application No. 2,804,597 dated Oct. 5, 2015.
The State Intellectual Property Office of the People's Republic of China, Office Action for Chinese Patent Application No. 201180033716.6 dated Aug. 28, 2015.
El Maghraoui et al., "Randomized Distributed Garbage Collection", Department of Computer Science, Rensselaer Polytechnic Institute, Dec. 10, 2003.

*Primary Examiner* — Mohsen Almani
(74) *Attorney, Agent, or Firm* — Lorenz & Kopf, LLP

(57) ABSTRACT

Described herein are techniques for managing content stored on a distributed network. Content is initially placed onto the network and populated across one or more nodes. The content is distributed in association with decay parameters that define a lifetime for the population of the content on the network. Various communication nodes of the distributed network are configured to process the content decay parameters to determine whether to delete the content during subsequent time periods.

11 Claims, 3 Drawing Sheets

METHODS AND APPARATUS FOR CONTROLLED REMOVAL OF CONTENT FROM A DISTRIBUTED NETWORK

CLAIM OF PRIORITY

This application claims the benefit of U.S. application Ser. No. 12/833,753 entitled "Methods and Apparatus for Controlled Removal of Content from a Distributed Network," filed Jul. 9, 2010, the entire contents of which are incorporated herein by reference.

FIELD OF THE INVENTION

One or more implementations relate generally to distributed network systems.

BACKGROUND

In a distributed network, data, such as audio/video content, is distributed and stored on multiple nodes of the network. These nodes may be end user devices or edge servers which distribute content to end user devices. Content is initially placed onto the network and may then be replicated across multiple nodes through any kind of peer-to-peer transfer process. In many networks, content is populated to various communication nodes based on a popularity of the content, e.g., more popular content is stored on a greater number of nodes than less popular content. Because more popular content is available on more communication nodes, it is easier for an end user to access such content. Furthermore, more efficient utilization of the bandwidth of the distributed network may be achieved by locating content closer to the end user.

In a video distribution system, the most popular content is typically the newest content, e.g., recent television programming or movie releases. However, as content ages, its popularity will decrease as viewers become more interested in recently released content. Management of the storage space on the distributed network is a potential problem faced by system operators. Each communication node has a finite amount of space that may be utilized to store content. Instead of replicating the same content on every communication node, some operators may take an approach of storing different combinations of content at each communication node. This allows for the distributed network to offer a greater variety of content. If a particular node does not store content requested by a user, then the communication node may request transfer of the content from another communication node that stores the content.

As content ages and becomes less popular, it is desirable to remove the content from at least some of the communication nodes in order to accommodate storage of newer content. However, it may not be desirable to delete all instances of the content from the distributed network, because a certain number of users may still desire to access the content. Thus, more effective management of content is desired to maintain an appropriate number of copies of content on the distributed network as the content ages.

BRIEF DESCRIPTION OF THE DRAWINGS

In the following drawings like reference numbers are used to refer to like elements. Although the following figures depict various examples, the one or more implementations are not limited to the examples depicted in the figures.

DETAILED DESCRIPTION

Figure 1:
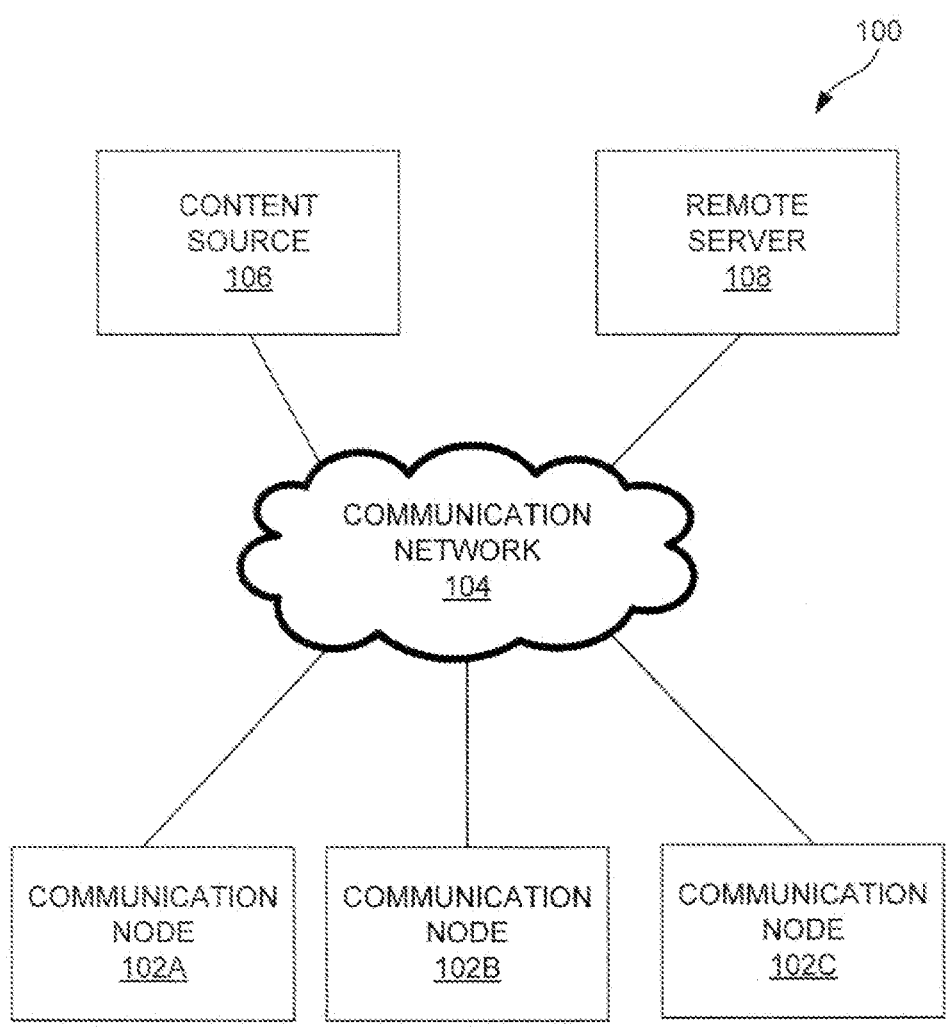
FIG. 1 illustrates an embodiment of a distributed network.

The various embodiments described herein generally provide apparatus, systems and methods which facilitate the reception, processing and outputting of content from one or more sources, via one or more communications mediums (or networks), for use by one or more users (or subscribers). More particularly, described herein are techniques for managing content stored on a distributed network. Content is initially placed onto the network and populated across one or more nodes. The content is distributed in association with decay parameters that define a lifetime for the population of the content on the network. Various communication nodes of the distributed network are configured to delete the content according to the decay parameters for the content on the network.

In at least one embodiment, each node periodically processes content decay parameters associated with the content to determine whether to delete the content from the communication node. In at least one embodiment, the content decay parameters define the population decay of the content on the distributed network. Thus, the content decay parameters define the probability of existence for particular content on a particular node at a specified time. The communication node utilizes the probability of existence to determine whether to delete the content at a specified time.

At least one embodiment provides a method for managing content in a distributed network. The method includes receiving content and metadata associated with the content at a communication node during a first time period. The metadata specifies at least one content decay parameter for the content on the distributed network. The method further includes storing the content and the metadata at the communication node. During a second time period, the method includes processing the content decay parameter at the communication node to determine whether to delete the content from the communication node. Responsive to determining that the content is to be deleted, the method includes deleting the content during the second time period.

Another embodiment described herein provides a communication node. The communication node comprises a communication interface operable to receive a plurality of content and metadata associated with each of the content. The metadata associated with each of the content specifies a content decay equation for the content on the distributed network. The communication node further includes a storage medium operable to store the plurality of content and the metadata associated with each of the content. A processor of the communication node is operable to compute at least one first value using a random number generator and periodically process the content decay equation for each of the content to calculate a second value for each of the content. The processor is further operable to determine whether to delete some of the content from the communication node based on the first values and the second values and initiate deletion of some of the content from the storage medium.

In various embodiments described herein, the content decay parameters define an equation that specifies the decay rate of the content on the distributed network. As content ages, it becomes less popular, and thus, less copies of the content may be desired on the network. The decay rate specifies how quickly the content may be removed from the communication node of the distributed network over a period time.

The decay rate equation may specify the decay rate according to any type of decrease rate, depending on desired design criteria. For example, in some embodiments, the decay rate may be specified according to a linear relationship. In other words, content is removed from the network in a linear fashion as the content ages on the network. In other embodiments, content may decay according to an exponential rate. The exponential decay rate may be specified for the content to take into account various factors, such as the initial popularity of recently released content that falls over time.

In at least one embodiment, the content decay parameters may define a half-life or mean lifetime of the associated content on the distributed network. The content decay parameters specify an equation that defines the probability of existence of an instance of content on the distributed network at a particular time. The equation defines an expected or desired population of the content at a specified time. For example, the original population of the content may comprise 100 copies each stored on a separate communication node during a first time period following release of the content. A month later a system operator may desire to reduce the population to 50 copies of the content. Thus, the content decay equation may be designed such that 50 communication nodes independently delete the content after one month.

Each communication node of the distributed network may separately compute the probability of existence of content using the content decay equation and determine whether to retain or delete the content on the communication node. If a sufficient population of communication nodes performs assessments of the probability of existence of the content based on the content decay parameters, then the population will likely decay to the desired number of copies at the specified time.

The techniques illustrated herein will be described in the context of a video distribution system and more particularly as applied to a television receiver. However, it is to be appreciated that the techniques described herein may be applied to the management of any kind of data on a distributed network. For example, the techniques described herein may be applied to audio data, image data, text documents, slideshow presentations and the like.

FIG. 1 illustrates an embodiment of a distributed network 100. The distributed network 100 includes a plurality of communication nodes 102A, 102B and 102C, a communication network 104, a content source 106 and a remote server 108. The distributed network 100 may include other components, elements or devices not illustrated for the sake of brevity.

Each communication node 102A-102C may comprise any type of electronic device capable of receiving, processing and/or storing data. In at least one embodiment, one or more of the communication nodes 102A-102C may comprise end-user devices capable of receiving and outputting content for presentation to a user. For example, the communication nodes 102A-102C may include a presentation device for outputting content (e.g., a television or computer) or may be a receiving device that processes and outputs content for presentation by another device (e.g., a set-top box that outputs content to a television). Examples of the communication nodes 102A-102C include a desktop, laptop or tablet computer, mobile telephone or other wireless communication device, personal digital assistant (PDA), television receiver (e.g., cable, satellite, over-the-air or internet protocol television (IPTV)), DVR, MP3 player or other audio playback device, video game console, portable video player and the like.

In other embodiments, one or more of the communication nodes 102A-102C may comprise servers that receive and store data and provide such data to other intermediary or end user devices. For example, the communication nodes 102A-102C may comprise audio and/or video servers that provide content to end user devices (e.g., television set-top boxes). In at least one embodiment, any of the communication nodes 102A-102C may comprise an intermediate server that facilitates the transfer of content to other servers which provide data to end user devices.

The communication network 104 is operable to communicatively couple together the communication nodes 102A-102C, the content source 106 and/or the remote server 108. The communication network 104 may be embodied as one or more logical and/or physical communication networks operable to communicatively couple any combination of the communication nodes 102A-102C, the content source 106 and/or the remote server 108. These networks may utilize any desired combination of wired (e.g., cable and fiber) and/or wireless (e.g., cellular, wireless, satellite, microwave, and radio frequency) communication mediums and any desired network topology (or topologies when multiple mediums are utilized). Exemplary communication networks include television distribution networks (e.g., satellite and cable television networks), wireless communication networks, public switched telephone networks (PSTN), and local area networks (LAN) or wide area networks (WAN) providing data communication services.

The content source 106 is operable for receiving, generating and communicating content to one or more communication nodes 102A-102C. The content to be received, processed, outputted and/or communicated may come in any of various forms including, but not limited to, audio, video, data, information, otherwise. In at least one embodiment, the content source 106 is operable for receiving various forms and types of content from other sources, aggregating the content and transmitting the content to one or more communication nodes 102A-102C through the communication network 104. It is to be appreciated that the content source 106 may receive practically any form and/or type of information from one or more sources including streaming television programming, recorded audio or video, electronic programming guide data and the like.

The optional remote server 108 is operable to provide metadata regarding content to any of the communication nodes 102A-102C. The metadata may specify various information regarding the content, such as content decay parameters for the content on the distributed network 100. For example, any of the communication nodes 102A-102C may receive content from another device and request the associated metadata for the content from the remote server 108. In at least one embodiment, the remote server 108 and the content source 106 may be integrated into a single device.

Content Seeding

During operation, the content source 106 places one or more pieces of content onto the distributed network 100. More particularly, the content source 106 may transmit the content to one or more of the communication nodes 102A-102C. In at least one embodiment, the content source 106 may transfer the content to each of the communication nodes 102A-102C. In other embodiments, the content source 106 may transfer the content to one or more of the communication nodes 102A-102C and the communication nodes 102A-

102C may further transfer the content to other devices using a peer-to-peer transfer protocol.

In some embodiments, the content may be distributed to a selected number of the communication nodes 102A-102C according to a pre-defined transfer/storage plan. For example, the content source 106 may initially transfer the content to the communication node 102A. In association with the transfer, the content may include instructions indicating that the content is to be further transferred to the communication node 102C. The communication node 102A may responsively transfer the content to the communication node 102C using a peer-to-peer transfer process.

In at least one embodiment, content may be transferred to various communication nodes 102A-102C according to the content decay parameters. For example, the communication node 102A may initially store a piece of content with associated content decay parameters. The communication node 102B may query the communication node 102A for available content and the associated content decay parameters. The communication node 102B may process the content decay parameters to determine whether to copy the content from the communication node 102A.

In some embodiments, particular content may be stored on a communication node 102A-102C as requested by a user or other associated devices. For example, a particular user of the communication node 102C may desire to access content which is stored on node 102A and/or node 102B but not node 102C. The communication node 102C may request to copy the content from the communication node 102A responsive to user input and output the content for viewing by the user. The communication node 102C may determine whether to maintain storage of the content subsequent to the viewing session in order to provide other users with the same content without re-copying the content from another communication node 102C.

In at least one embodiment, the content may be transferred in association with metadata specifying the content decay parameters. For example, the content source 106 may transfer the content with the content decay parameters to one or more of the communication nodes 102A-102C. In at least one embodiment, a communication node 102A-102C may receive content without the associated content decay parameters and may request the content decay parameters from the remote server 108, either in association with reception of the content or at a later time.

Content Deletion

The communication nodes 102A-102C are configured to periodically process the content decay parameters to determine whether to delete the associated content. For example, the content decay parameter may comprise an equation specifying a mean lifetime or half-life cycle for the content. Based on the equation, a communication node 102A-102C determines the probability of existence of the content and hence, whether to delete the content from the communication node 102A-102C.

The communication node may perform the aforementioned process at any appropriate periodic interval to determine whether to delete various content from the communication node. For example, the process may be performed daily, weekly or monthly as desired. In at least one embodiment, the process is performed when the storage capacity utilized on the communication node 102A-102C reaches a specified utilization (e.g., 75%). In at least one embodiment, the process may be performed prior to a scheduled update of the content on the communication node 102A-102C. For example, if content is updated on the distributed network 100 every Tuesday, then a communication node 102A may perform a deletion process on Monday evening in order to free storage space to accommodate newly released content.

As described above, in at least one embodiment, the content decay parameters may specify an exponential decay rate of the content. The designer may specify an appropriate decay rate such that a desired number of instances of the content will remain on the distributed network 100 at a specified time. Equation #1 illustrates one embodiment of an exponential decay function.

$$P(t) = A*B^t \qquad \text{Equation \#1}$$

In equation #1, variable A defines the initial amount of content on the distributed network 100 and variable B defines the amount of content that will remain on the distributed network 100 for each successive time period. Thus, the variable B is defined based on the content decay rate. For example, if the decay rate is 10% per week, then the variable B is defined as 0.90, because 90% of the previous population remains each successive week. The variable t defines the elapsed time of the content on the distributed network 100, e.g., the number of time periods.

Take for example the situation where the content is initially stored on 100 communication nodes 102A-102C and the decay rate is 25% per week. Thus, equation #1 may be solved as $P(t)=100*(0.75)^t$. After 1 time period, the population of content is 75 copies. After 2 time periods, the population of content is 56 copies and after 3 time periods, the population of content is 42 copies.

A communication node 102A-102C processes equation #1 with appropriate variables to determine a value for the content decay parameter. Based upon the designated value, the communication node 102A-102C determines whether to delete the content from the associated storage medium of the communication node 102A-102C. In one embodiment, each communication node 102A-102C computes a random number within a specified range. If the random number is greater than the value computed for G(v), then the communication node 102A-102C makes a determination to delete the content.

For example, in the example illustrated above, the value of P(t) has a minimum of 0 and a maximum of 100. In one embodiment, each communication node 102A-102C computes a random number between 0 and 100 and compares the number with the value computed for P(t). During a time period $T_1$, the value of P(t) is 75. Take for example the situation where communication node 102A computes a random number of 81, communication node 102B computes a random number of 3 and communication node 102C computes a random number of 55. Thus, communication node 102A will delete the content from its storage medium and communication nodes 102B and 102C will retain the content. Over an appropriately sized population of communication nodes 102A-102C, 25% of the communication nodes 102A-102C will independently delete the content during the specified time period and the remaining 75% of the communication nodes will retain the content in storage based on the described process.

It is to be appreciated that any appropriate exponential function may be utilized to describe the decay rate of the content. In at least one embodiment, a mean life time or half-life cycle equation may be utilized for the content on the distributed network 100. A half-life cycle describes the amount of time that a set amount of content on the distributed network 100 will decay to half the original population. In other words, with a sufficient population of content that decays at a set-rate, the half-life cycle describes the expected number of nodes which will maintain the content at a specific time. Equation #2 shows one embodiment of a half-life cycle equation that may be utilized in accordance with the teachings described herein.

$$P(t)=A+K^{*}\exp\hat{\ }(-(t-T_{seed}-T_{offset})/T_{m}) \quad \text{Equation #2}$$

In equation #2, t is defined as a current time at the communication node 102A-102C. In at least one embodiment, the variable t defines a common time utilized by each communication node 102A-102C to process Equation #2. The value $T_{seed}$ specifies a time that the content is launched onto the distributed network. Preferably, $T_{seed}$ is specified relative to a similar time as t. The value of $T_{offset}$ specifies a time offset defined for growth of the content on the distributed network. This allows sufficient time for the content to grow on the network before communication nodes 102A-102C begin to delete the aging content. The value of $T_m$ specifies a mean lifetime for the content on the distributed network.

The values of A and K are numerical constants defined to control the rate of decay of the content on the distributed network 100 and may be selected depending on desired design criteria. More particularly, the value of A may be defined such that a certain percentage of the communication nodes 102A-102C maintain copies of the content during a long duration after the content is launched onto the distributed network 100. For example, the value of A may be selected to maintain the population of content on at least 10% of the communication nodes 102A-102C overtime. The value of K specifies the size of the initial desired population of the content on the distributed network 100.

The value of P(t) will have a maximum value of A+K. As described above, each communication node 102A-102C may compute a random number R, in the range 0<=R<=A+K. If R is greater than the value of P(t), then the communication node 102A-102C deletes the content. However, if the value of P(t) is less than or equal to R, then the communication node 102A-102C decides to maintain the content. In at least one embodiment, the values of A+K are selected to produce a value of P(t) between 0 and 1. Furthermore, the random number may be generated in the range of 0<=R<=1.

The techniques described herein are beneficial because the decay of content on the distributed network 100 is controlled over time to delete aging content and make room for newer content. Furthermore, each communication node 102A-102C may independently delete content without querying a central server for deletion instructions. Thus, a centralized remote server 108 may not be needed in order to instruct the communication nodes 102A-102C to delete content. Even if a centralized remote server 108 is used to supply the content decay parameters to the communication nodes 102A-102C, each node can independently process the content decay parameters at appropriate times, obviating the need to overtax the remote server 108. Additionally, the techniques described herein allow for content to be deleted on each communication node 102A-102C even if the communication link between various components of the distributed network 100 is temporarily inoperative.

Figure 2:
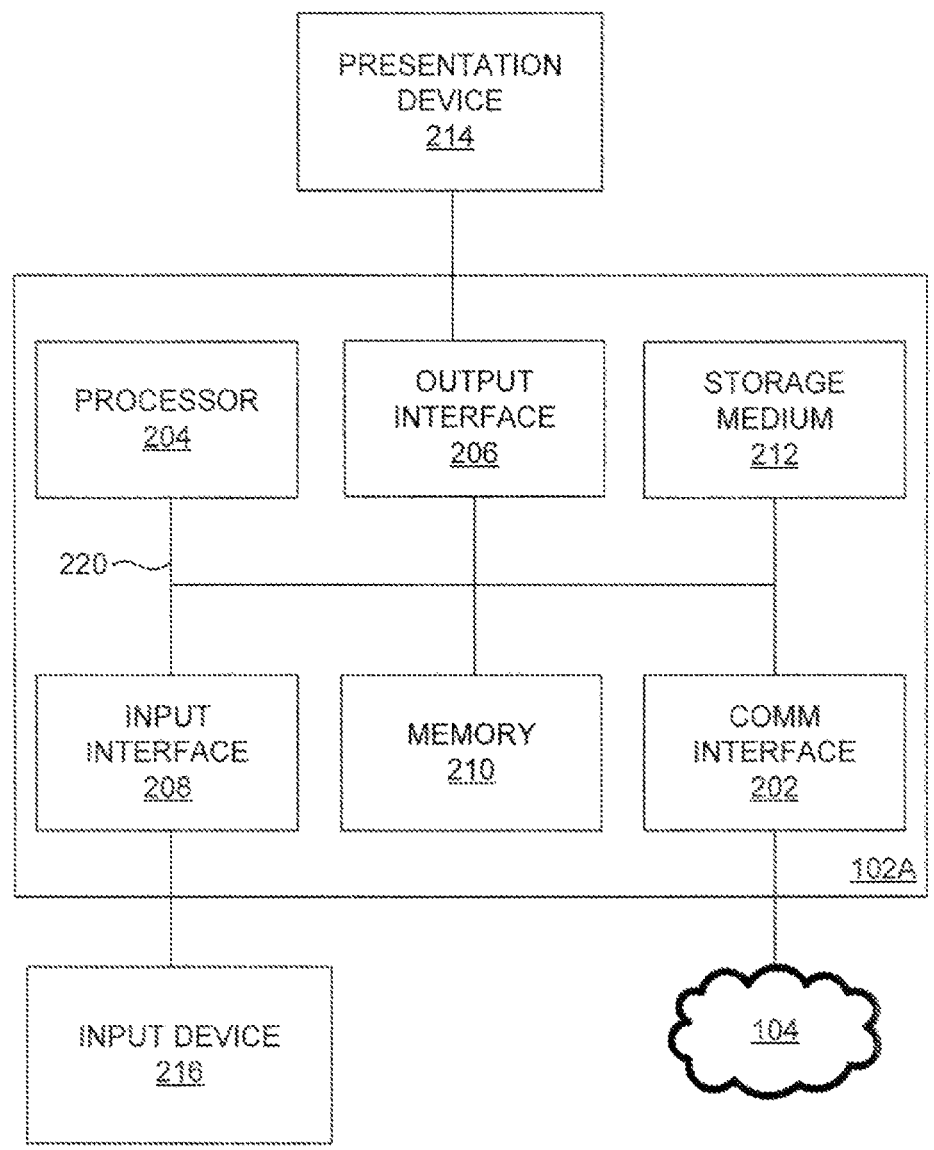
FIG. 2 illustrates an embodiment of a communication node of FIG. 1.

FIG. 2 illustrates an embodiment of a communication node 102A of FIG. 1. The communication node 102A includes a communication interface 202, a processor 204, an output interface 206, an input interface 208, a memory 210 and a storage medium 212. The components of the communication node 102A may be communicatively coupled together by one or more data buses 220 or other type of data connection. The communication node 102A may include other elements, components or devices not illustrated for the sake of brevity.

The communication node 102A may comprise any type of computing device, such as a television receiver, personal computer, laptop, server, audio playback device or the like. The processor 204 is operable for controlling the operation of the communication node 102A. As used herein, processor 204 refers to a single processing device or a group of inter-operational processing devices. The operation of processor 204 may be controlled by instructions executable by processor 204. Some examples of instructions are software, program code, and firmware. Various embodiments of processor 204 include any sort of microcontroller or microprocessor executing any form of software code.

The processor 204 is communicatively coupled to the memory 210, which is operable to store data during operation of the processor 204. Such data may include software and firmware executed by the processor 204 as well as system and/or program data generated during the operation of the processor 204. Memory 210 may comprise any sort of digital memory (including any sort of read only memory (ROM), RAM, flash memory and/or the like) or any combination of the aforementioned.

The communication node 102A also includes a storage medium 212, which is any kind of mass storage device operable to store files and other data associated with the communication node 102A. In at least one embodiment, the storage medium 212 comprises a magnetic disk drive that provides non-volatile data storage. In another embodiment, the storage medium 212 may comprise flash memory. It is to be appreciated that the storage medium 212 may be embodied as any type of magnetic, optical or other type of storage device capable of storing data, instructions and/or the like.

In the embodiment shown in FIG. 2, the communication node 102A also includes an appropriate communication interface 202, which operates using any implementation of protocols or other features to support communication by the communication node 102A on the communication network 104. In various embodiments, communication interface 202 supports conventional LAN, WAN or other protocols (e.g., the TCP/IP or UDP/IP suite of protocols widely used on the Internet) to allow the communication node 102A to communicate on communication network 104 as desired. Communication interface 202 typically interfaces with communication network 104 using any sort of LAN adapter hardware or the like provided within communication node 102A.

The communication node 102A also includes an output interface 206 operable to interface with a presentation device 214. More particularly, the output interface 206 is operable to output information for presentation by the presentation device 214. The output interface 206 may be operable to output any type of presentation data to the presentation device 214, including audio data, video data, audio/video (A/V) data, textual data, imagery or the like.

The presentation device 214 may comprise any type of device capable of presenting data received from the communication node 102A. In at least one embodiment, the presentation device 214 comprises a monitor communicatively coupled to the output interface 206 via any type of appropriate wired or wireless connection. In another embodiment, the presentation device 214 comprises a television communicatively coupled to the output interface 206 via video or A/V cabling, such as component A/V cables, composite A/V cables, High-Definition Multimedia Interface (HDMI) cables, S-video cables, coaxial cables or a wireless connection, e.g., WiFi, Bluetooth and the like. In at least one embodiment, the presentation device 214 comprises an audio receiver and/or one or more speakers for outputting audio data, such as music.

It is to be appreciated that the communication node 102A and the presentation device 214 may be separate components or may be integrated into a single device. For example, the communication node 102A may comprise a set-top box (e.g., a cable television or satellite television receiver) and the presentation device 214 may comprise a television communicatively coupled to the set-top box. In another example, the communication node 102A and the presentation device 214 may be embodied as a laptop with an integrated display screen or a television with an integrated cable receiver, satellite receiver and/or DVR.

The input interface 208 is operable to interface with one or more input devices 216. The input device 216 may comprise any type of device for inputting data to the communication node 102A. More particularly, data received from the input device 216 may be used to control the operation of the processor 204 and/or the output of data to the presentation device 214. The input interface 208 and the input device 216 may be communicatively coupled using any type of wired or wireless connection, including USB, WiFi, infrared and the like. In some embodiments, the input interface 208 may comprise a wireless receiver for receiving any type of RF or IR communication from the input device 216. Exemplary input devices 216 include keyboards, mice, buttons, joysticks, microphones, remote controls, touch pads and the like. In at least one embodiment, the communication node 102A comprises a television receiver or video output device and the input device 216 comprises a television remote control communicatively coupled to the television receiver.

The input device 216 may be further operable to control the operation of the presentation device 214. For example, the presentation device 214 may comprise a television that is remotely controlled by the input device 216 using IR or RF signals. In at least one embodiment, the input device 216 may be integrated with the presentation device 214. For example, the input device 216 and the presentation device 214 may comprise a touch screen display. The input device 216 may also be integrated with the communication node 102A. For example, the input device 216 may comprise buttons of the communication node 102A, such as an integrated keyboard of a laptop or a front panel display with buttons of a television receiver or other type of entertainment device.

In operation, the communication interface 202 receives various content from the content source 106 (see FIG. 1) and or other communication nodes 102B-102C through the communication network 104. The communication interface 202 may also receive metadata associated with the content, either from the content source 102, the remote server 108 and/or the other communication nodes 102B-102C. In at least one embodiment, the communication interface 202 is also configured to transmit content to other communication nodes 102B-102C through a peer-to-peer transfer process.

Responsive to reception of the content and/or associated metadata, the processor 204 coordinates storage of the content and/or metadata onto the storage medium 212. More particularly, the content and/or metadata is received and stored by the communication node 102A during a first time period. In at least one embodiment, the processor 204 may operate to initiate a query to the remote server 108 (see FIG. 1) if content is received that does not include the associated metadata.

During a subsequent time period, the processor 204 is operable to process the metadata to determine whether to delete a particular piece of content from the storage medium 212. In at least one embodiment, the processor 204 operates to compute a first value using a random number generator. The processor 204 further generates a second value for the content based on the content decay parameters. As described above, in at least one embodiment, the content decay parameters specify an equation utilized to generate the second value. The processor 204 compares the first and second values to determine whether to delete the content from the storage medium 212. A similar process may be performed during each time period for each of the content stored on the storage medium 212.

In at least one embodiment, the processor 204 is operable to perform a similar computation using the content decay equation periodically for the content. For example, the periodic process may be performed weekly. In the first week, the computation may result in a determination by the processor 204 to retain the content on the storage medium 212. However, another instance of the computation performed a week later may result in the processor 204 initiating deletion of the content from the storage medium 212.

Figure 3:
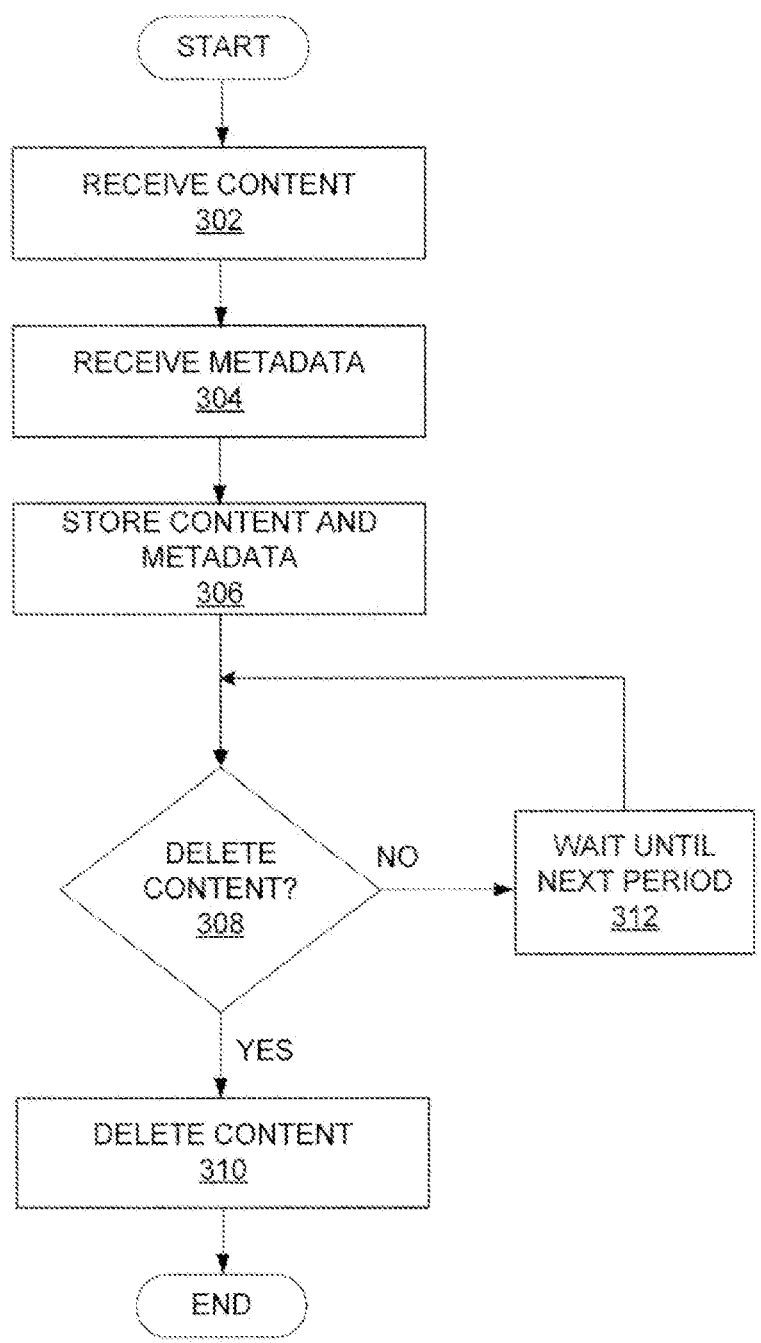
FIG. 3 illustrates an embodiment of a process for managing content in a distributed network.

FIG. 3 illustrates an embodiment of a process for managing content in a distributed network. More particularly, the process of FIG. 3 is utilized to determine whether to remove particular content from a communication node. The process of FIG. 3 may be performed separately for each of the content stored on the communication node depending on desired design criteria. The process of FIG. 3 may include other operations not illustrated for the sake of brevity.

The process includes receiving content at a communication node during a first time period (operation 302). The process further includes receiving metadata associated with the content (operation 304). The metadata specifies at least one content decay parameter for the content on a distributed network. In at least one embodiment, the content decay parameter comprises a content decay equation associated with the content.

The communication node may receive the content and the metadata together or separately depending on desired design criteria. For example, the metadata may be integrated with the file for the content or may be transmitted in association with the content in a separate file. In another embodiment, the communication node may receive the content without the associated metadata and may request the metadata separately from the remote server. The process further includes storing the content and the metadata on a storage medium associated with the communication node (operation 306).

In operation 308, the communication node processes the content decay parameter at the communication node during a second time period to determine whether to delete the content from the communication node. In at least one embodiment, operation 308 includes computing a first value based on the content decay parameter for the content and computing a second value using a random number generator. The communication node then determines whether to delete the content based on the first value and the second value. In at least one embodiment, the decision whether to delete the content is determined based on a comparison of the first value and the second value.

If operation 308 results in a determination that the content is to be deleted, then processing continues in operation 310 and the content is deleted from the storage medium during the second time period. If operation 308 results in a determination that the content is not to be deleted, then processing continues in operation 312 and the content is retained for at least another time period. Processing then loops back to operation 308 and another instance of operation 308 may be performed during a third time period. During the subsequent instances of operation 308, a new first value is generated based on the updated time and the content decay parameters. Likewise, a new second value is generated using the random number generator. In at least one embodiment, during each subsequent instance of operation 308, the probability increases that the content will be deleted from the storage medium associated with the communication node.

Although specific embodiments were described herein, the scope of the invention is not limited to those specific embodiments. The scope of the invention is defined by the following claims and any equivalents therein.

What is claimed is:

1. A method for managing content by one of a plurality of communication nodes in a distributed network, the method comprising:
    receiving content and metadata associated with the content at a plurality of communication nodes during a first time period, each of the plurality of communication nodes being a unique server configured to distribute content to end users, the metadata specifying at least one content decay parameter for the content on the distributed network, the at least one content decay parameter defining a probability of existence for the content on the distributed network at one of the plurality of communication nodes at each predetermined time based upon a mean lifetime for the content on the distributed network;
    storing the content and the metadata on at least two different communication nodes of the plurality of communication nodes;
    processing the content decay parameter at each of the respective communication nodes which stored the content during one of the predetermined times corresponding to a second time period, different than the first time period, to determine whether to delete the content from the respective communication node; and
    responsive to determining that the content is to be deleted, deleting the content during the second time period at the respective communication node,
    wherein the probability of existence for the content on the distributed network of the content decay parameter comprises an equation specifying a half-life cycle of the content on the distributed network, the equation specifying a half-life cycle of the content determining a percentage of the plurality of communication nodes which are to store the content during the first time period, a minimum percentage of the plurality of nodes to store the content at a future time period and a rate of decay, wherein the rate of decay is based upon the mean lifetime for the content on the distributed network and a difference between the first time period, the second time period and a time offset defined for growth of the content on the distributed network, and
    the half-life of the content is defined as $P(t)=A+K*\exp\hat{}(-(t-T_{seed}-T_{offset})/T_m)$, wherein t is a current time, $T_{seed}$ is a time that the respective content is launched onto the distributed network, $T_{offset}$ is a time offset defined for growth of the respective content on the distributed network, $T_m$ is a mean lifetime for the respective content on the distributed network, A is a minimum percentage of the plurality of communication nodes to store the respective content at a future time period, and K is the percentage of the plurality of communication nodes which are to store the content during the first time period.

2. The method of claim 1, wherein processing the content decay parameter further comprises:
    computing a second value, at the communication node, using a random number generator; and
    determining to delete the respective content when the value of P(t) calculated for the respective content is less than the second value.

3. The method of claim 2, further comprising determining not to delete the respective content when the value of P(t) calculated for the respective content is greater than the second value.

4. The method of claim 1, further comprising: requesting, after receiving the plurality of content, the values associated with $T_{offset}$, $T_m$, A and K associated with the each of the respective content from a remote server.

5. A communication node comprising:
    a communication interface configured to receive a plurality of content and metadata associated with each of the content from a distributed network configured to be communicatively coupled to a plurality of other communication nodes, the metadata associated with each of the content specifying a content decay equation for the content on the distributed network, the content decay equation defining a probability of existence for the content on the communication node at each predetermined time based upon a mean lifetime for the content on the distributed network, the communication node and the plurality of other communication nods each being a unique server configured to distribute content to end users;
    a storage medium configured to store the plurality of content and the metadata associated with each of the content; and
    a processor configured to:
        compute at least one first value using a random number generator;
        process the content decay equation at each predetermined time for each of the content to calculate a second value for each of the content;
        determine whether to delete at least one of the content from the communication node based on the at least one first value and the plurality of second values; and
        initiate deletion of the at least one of the content from the storage medium,
    wherein the probability of existence for the content decay equation is based upon a half-life for the content on the distributed network, the equation specifying a half-life cycle of the content determining a percentage of the plurality of unique servers which are to store the content during the first time period, a minimum percentage of the unique servers to store the content at a future time period and a rate of decay, wherein the rate of decay is based upon the mean lifetime for the content on the distributed network and a difference between a time when the respective communication node received the content, a current time corresponding to the periodic process and a time offset defined for growth of the content on the distributed network, and
    wherein the half-life of the content is defined as $P(t)=A+K*e\hat{}(-(t-T_{seed}-T_{offset})/T_m)$, wherein t is a current time, $T_{seed}$ is a time that the respective content is received by the comm node, $T_{offset}$ is a time offset defined for growth of the respective content, $T_m$ is a mean lifetime for the respective content, A is a minimum future storage variable, and K is an initial storage variable at a predetermined time.

6. A method for managing content in a distributed network, the method comprising:

receiving content at a plurality of communication nodes during a first time period each of the plurality of communication nodes being a unique server configured to distribute content to end users;

receiving metadata associated with the content at the respective communication nodes, the metadata specifying an equation for a half-life cycle for the content on a distributed network, the equation for a half-life cycle defining a probability of existence for the content on the distributed network at one of the plurality of communication nodes at each predetermined time based upon a mean lifetime for the content on the distributed network;

computing a first value, at each of the plurality of communication node during a predetermined time corresponding to a second time period different than the first time period, based on the half-life cycle of the content;

computing a second value, at each of the plurality communication node, using a random number generator;

determining, at each of the plurality of communication nodes, whether to delete the content from the respective communication node based on the first value and the second value; and responsive to determining that the content is to be deleted, deleting the content during the second time period, wherein the probability of existence for the equation specifying the half-life cycle for the content determines a percentage of the plurality of communication nodes which are to store the content during the first time period, a minimum percentage of the communication nodes to store the content at a future time period and a rate of decay, wherein the rate of decay is based upon the mean lifetime for the content on the distributed network and a difference between the first time period, the second time period corresponding to a current time and a time offset defined for growth of the content on the distributed network, and wherein the half-life cycle of the content is defined as $P(t)=A+K*e^{\wedge}(-(t-T_{seed}-T_{offset})/T_m)$, wherein t is a current time, $T_{seed}$ is a time that the respective content is launched onto the distributed network, $T_{offset}$ is a time offset defined for growth of the respective content on the distributed network, $T_m$ is a mean lifetime for the respective content on the distributed network, A is a minimum percentage of the plurality of communication nodes to store the respective content at a future time period, and K is the percentage of the plurality of communication nodes which are to store the content during the first time period.

7. The method of claim 6, further comprising requesting the values associated with $T_{offset}$, $T_m$, A and K associated with the respective content from a remote server.

8. The communication node of claim 5, wherein the processor is further configured to delete a respective one of the plurality of content when the value of P(t) calculated for the respective one of the plurality of content is less than the first value.

9. The communication node of claim 8, wherein the processor is further configured to save the respective one of the plurality of content save when the value of P(t) calculated for the respective content is greater than the first value.

10. The method of claim 6, further comprising:

computing a first value, at the communication node, using a random number generator; and determining to delete the respective content when the value of P(t) calculated for the respective content is less than the first value.

11. The method of claim 10, further comprising:

determining to save the respective content when the value of P(t) calculated for the respective content is greater than the first value.

* * * * *